March 19, 1940. W. STANGOHR 2,194,409
STENCIL CIRCLE CUTTER
Filed Aug. 24, 1939
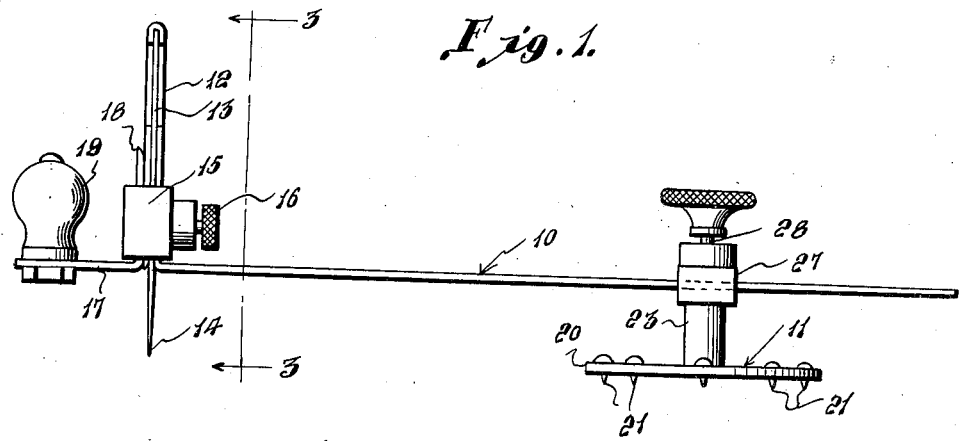
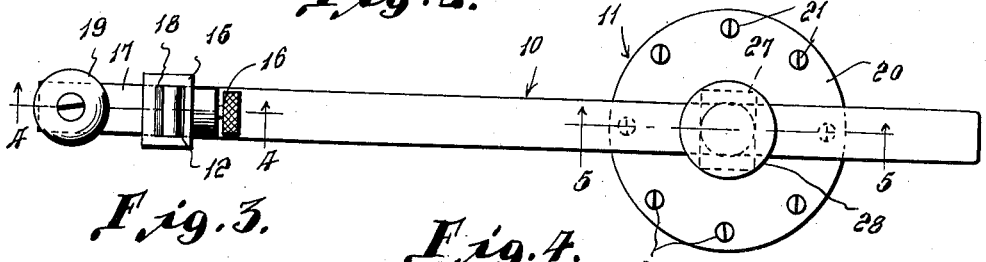
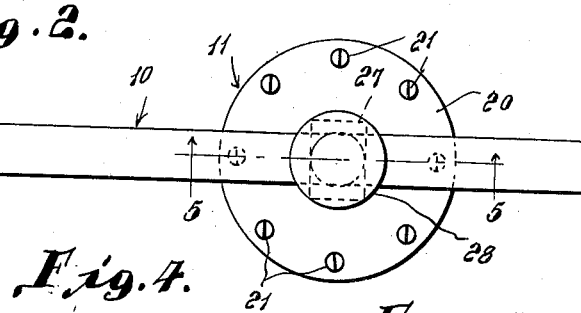
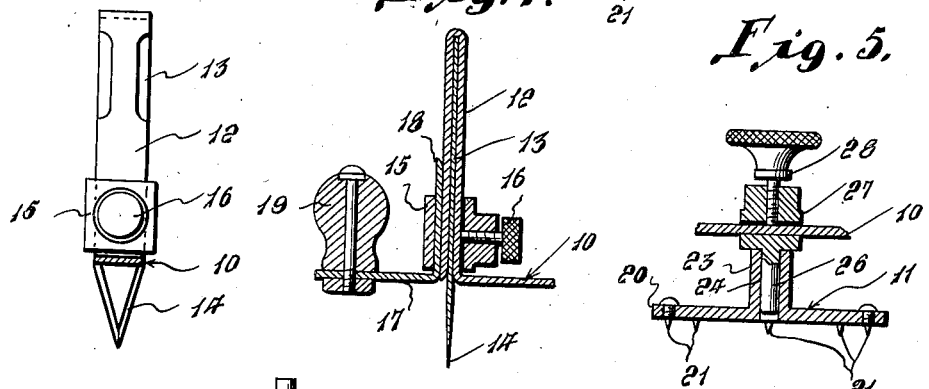
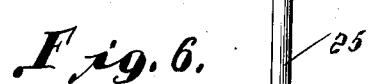
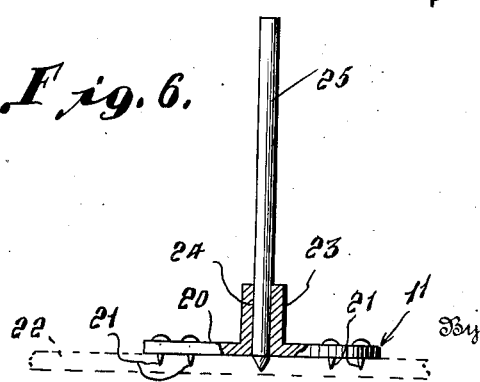
Inventor
William Stangohr
By L. F. Randreth
Attorney Patented Mar. 19, 1940

2,194,409

UNITED STATES PATENT OFFICE 2,194,409

STENCIL CIRCLE CUTTER

William Stangohr, Missoula, Mont.

Application August 24, 1939, Serial No. 291,770

3 Claims. (Cl. 164—71)

The present invention relates to a device for cutting circles especially in sand blast rubber, although it may be used for cutting gaskets in rubber, leather packing, linoleum and equivalent materials, generally.

I especially provide a novel means whereby the device may be accurately swung on any desired center and will have efficient bearing so that the circle will be true, especially in sand blast rubber.

I further aim to provide a novel bearing or center device for the cutter, having a portion to accommodate a centering pin upon which it may be located, and which portion serves as a bearing for the movable parts.

In addition, it is aimed to provide a novel beam or bar and mounting for the cutting instrument.

The more specific objects and advantages will become apparent from a consideration of the description following taken in connection with accompanying drawing illustrating an operative embodiment.

In said drawing—

Figure 1 is a view of the implement or cutter in side elevation;

Figure 2 is a plan view of the parts of Figure 1;

Figure 3 is a vertical sectional view taken on the line 3—3 of Figure 1;

Figure 4 is a vertical sectional view taken on the line 4—4 of Figure 2;

Figure 5 is a vertical sectional view taken on the line 5—5 of Figure 2, and

Figure 6 is a view partly in elevation and partly in section, showing the use of the center bearing in connection with a centering pin.

Referring specifically to the drawing wherein like reference characters designate like or similar parts, the device embodies a beam or bar of suitable length as at 10 which is adapted to be swung from the axis of a center bearing 11. Such bar has a vertical clasp or U-shaped portion at 12 in the space of which a removable cutter 13 is disposed and which extends at its cutting portion 14, below the beam.

A square or other clamping collar 15 removably surrounds the clasp 12 and has a screw 16, threaded therein and adapted for binding engagement of its shank against the clasp to securely clamp the cutter 13 in place.

An L-shaped bracket is provided at 17, having one arm 18, removably extending through the collar 15 and bearing against the clasp 12 so as to be clamped removably but rigidly in place by the action of the collar and screw 16. Bracket 17 is provided with a suitable knob 19.

Reverting to the center bearing, it may conveniently be a disk or plate 20 having a plurality of spurs 21 depending therefrom and adapted for anchoring engagement with the material 22, to be cut, and such as sand blast rubber, other rubber, leather packing, linoleum or the like. Such disk or plate 20 has a central upstanding hub or bearing 23 with a bore 24 open throughout.

In using the device, a centering pin such as 25, in Figure 6, is placed at the desired center on which the beam is adapted to swing, being capped if desired. While the centering pin 25 is in such position, the center bearing 11 is engaged with the pin 25 by sliding the center bearing at its bore 24 downwardly on the pin to the position of Figure 6, where the spurs 21 will engage the material 22 and hold the center bearing against rotation relatively to the material 22. Thereupon the pin 25 is withdrawn. Thereupon, the beam 10 is disposed in operative position for cutting, with a depending round stud 26, removably occupying and journaled in the bore 24, so that the beam 10 may then be swung over the material 22, with the cutter 13 cutting the circle, from the vertical axis of bearing 23, as a center.

The stud 26 may be applied to the beam 10 in any suitable manner. It preferably consists of a collar or slide 27, with which the stud is integral. Slide or collar 27 is movable to any adjusted position along the beam 10 and is adapted to be fastened thereto by the binding action of the shank of a screw 28, threaded in the slide or collar 27.

Various changes may be resorted to provided they fall within the spirit and scope of the invention.

I claim as my invention:

1. In combination, a plate, means on the plate to hold it immovable relative to engaged material, a bearing rising from said plate substantially centrally thereof and having a bore extending completely therethrough, so that it may be applied over a centering pin, a cutter device having a depending stud removably journaled in said bore, said cutter device including a beam having an upwardly extending clasp, a cutter disposed in the clasp, a collar surrounding the clasp, a bracket having a portion extending into the collar and against the clasp, and binding means on the collar operable to clamp the clasp and bracket therein.

2. A cutter of the class described including a beam, means to pivotally mount the beam, said beam having a vertical U-shaped portion forming a clasp, a cutter within the clasp, a bracket having a portion disposed against the clasp, a collar surrounding the clasp and adjacent portion of the bracket, and clamping means carried by the collar and engageable against the clasp.

3. In combination, a plate, means on the plate for penetration into engaged material to hold the plate immovable relatively to the latter, a bearing rising substantially centrally from said plate having a bore extending completely therethrough so that it may be applied over a centering pin, a stud removably journaled in said bore having a portion resting on the top of the bearing, a beam mounted by said stud, said beam having an upwardly extending clasp, a cutter disposed in the clasp, and means operable to bind a cutter in the clasp.

WILLIAM STANGOHR.